United States Patent
Schild

(10) Patent No.: US 10,726,250 B2
(45) Date of Patent: Jul. 28, 2020

(54) METHOD AND APPARATUS FOR IMPROVING RECOGNITION ACCURACY FOR THE HANDWRITTEN INPUT OF ALPHANUMERIC CHARACTERS AND GESTURES

(71) Applicant: Continental Automotive GmbH, Hannover (DE)

(72) Inventor: Bernhard Schild, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 53 days.

(21) Appl. No.: 15/771,972

(22) PCT Filed: Oct. 28, 2016

(86) PCT No.: PCT/EP2016/076102
§ 371 (c)(1),
(2) Date: Apr. 27, 2018

(87) PCT Pub. No.: WO2017/072307
PCT Pub. Date: May 4, 2017

(65) Prior Publication Data
US 2018/0225507 A1    Aug. 9, 2018

(30) Foreign Application Priority Data
Oct. 30, 2015   (DE) .................. 10 2015 221 304

(51) Int. Cl.
*G06K 9/00*   (2006.01)
*G06K 9/72*   (2006.01)
(Continued)

(52) U.S. Cl.
CPC ....... *G06K 9/00436* (2013.01); *G06F 3/0237* (2013.01); *G06F 3/04883* (2013.01);
(Continued)

(58) Field of Classification Search
CPC .............. G06K 9/00436; G06K 9/723; G06K 2209/01; G10L 13/043; G10L 15/22;
(Continued)

(56) References Cited

U.S. PATENT DOCUMENTS 5,850,480 A * 12/1998 Scanlon ................ G06K 9/723
382/229
6,334,003 B1 * 12/2001 Yokota ............... G06F 3/04883
345/179

(Continued)

FOREIGN PATENT DOCUMENTS

EP      2088536 A1   8/2009
WO   02/10884 A2   2/2002

OTHER PUBLICATIONS

Office Action dated Mar. 29, 2018 from corresponding German Patent Application No. 10 2015 221 304.8.

(Continued)

*Primary Examiner* — Xuemei G Chen

(57) ABSTRACT

A method for automatically selecting one of a plurality of recognition algorithms for a handwritten input of alphanumeric characters and/or gestures into a selected input field displayed on a screen using a touch-sensitive input apparatus comprises carrying out optical character recognition in a region of the screen which comprises at least the input field and the immediate environment of the input field, or carrying out voice recognition for a voice instruction acoustically output after the selected input field has been displayed. Terms describing field types are searched for in the result of the optical character recognition or the voice recognition, and a recognition algorithm which is adapted to a field type found in the result of the optical character recognition or the voice recognition is selected.

10 Claims, 2 Drawing Sheets

(51) Int. Cl.
*G06F 3/0488* (2013.01)
*G06F 3/023* (2006.01)
*G10L 13/04* (2013.01)
*G10L 15/22* (2006.01)
*G10L 15/26* (2006.01)
*H04L 29/08* (2006.01)

(52) U.S. Cl.
CPC ............ *G06K 9/723* (2013.01); *G10L 13/043* (2013.01); *G10L 15/22* (2013.01); *G06K 2209/01* (2013.01); *G10L 15/26* (2013.01); *H04L 67/10* (2013.01)

(58) Field of Classification Search
CPC ... G10L 15/26; G06F 3/04883; G06F 3/0237; H04L 67/10
See application file for complete search history.

(56) References Cited

U.S. PATENT DOCUMENTS

| | | | |
|---|---|---|---|
| 7,489,415 B2 | 2/2009 | Furuta et al. | |
| 8,879,783 B1* | 11/2014 | Wang | G06K 7/10 382/100 |
| 9,594,951 B2* | 3/2017 | Bouaziz | G06K 9/723 |
| 2003/0004991 A1 | 1/2003 | Keskar et al. | |
| 2007/0092140 A1 | 4/2007 | Handley | |
| 2008/0210474 A1* | 9/2008 | Lai | G06F 3/016 178/18.03 |
| 2009/0125224 A1 | 5/2009 | Basche et al. | |
| 2011/0025630 A1* | 2/2011 | Kim | G06F 3/04883 345/173 |
| 2011/0060584 A1 | 3/2011 | Ferrucci et al. | |
| 2012/0242587 A1* | 9/2012 | Tom | G06F 3/04883 345/173 |
| 2012/0245945 A1* | 9/2012 | Miyauchi | G10L 15/06 704/275 |
| 2013/0157727 A1 | 6/2013 | Sudo et al. | |
| 2013/0330005 A1* | 12/2013 | Lu | G06K 9/18 382/182 |
| 2014/0156272 A1* | 6/2014 | Sieger | G10L 15/26 704/235 |
| 2014/0201102 A1 | 7/2014 | Srinivasan et al. | |
| 2015/0206526 A1* | 7/2015 | Schild | G01C 21/3629 704/258 |
| 2015/0242113 A1* | 8/2015 | Nguyen Thien | G06F 3/016 345/173 |
| 2015/0348550 A1* | 12/2015 | Zhang | G06F 3/167 704/235 |
| 2016/0012315 A1* | 1/2016 | Perrin | G06K 9/2063 382/161 |
| 2016/0019431 A1* | 1/2016 | Wang | G06K 9/2054 382/182 |
| 2016/0110148 A1* | 4/2016 | Egle | B60K 37/06 345/173 |
| 2016/0277903 A1* | 9/2016 | Poosala | H04W 4/12 |

OTHER PUBLICATIONS

International Search Report and Written Opinion dated Jan. 13, 2017 from corresponding International Patent Application No. PCT/EP2016/076102.

* cited by examiner

METHOD AND APPARATUS FOR IMPROVING RECOGNITION ACCURACY FOR THE HANDWRITTEN INPUT OF ALPHANUMERIC CHARACTERS AND GESTURES

BACKGROUND

Field of Technology

The present invention relates to the field of user interfaces, in particular to the handwritten input of letters and numbers or gestures on a touch-sensitive screen or on a touch-sensitive input unit arranged separately from a screen.

Background

Modern motor vehicles are equipped with a multiplicity of user interfaces for operating the wide variety of functions. Recently, the user interfaces have increasingly included touch-sensitive screens or touch-sensitive input units which are fitted in a central position in a manner easily reachable by the driver of a motor vehicle. Accordingly, modern motor vehicles have computer systems which are set up to capture the user inputs needed to operate the motor vehicle or the systems installed in the motor vehicle via the touch-sensitive screens or the touch-sensitive input units.

The computer systems in modern motor vehicles are often powerful enough to be expanded with additional applications and programs and to provide additional functions. These additional applications and programs generally likewise require user inputs during execution.

If it is necessary to input alphanumeric characters, a virtual keyboard can be displayed on a touch-sensitive screen, for example. However, alphanumeric characters can also be input by means of handwriting recognition, during which the user writes letters and numbers on the touch-sensitive screen or on a touch-sensitive input unit, also known as a touchpad, arranged separately from the screen using a finger or a suitable object.

On account of the limited size of the touch-sensitive screens or touch-sensitive input units arranged in motor vehicles, direct handwritten input of alphanumeric characters into fields of an input mask which are provided for this purpose is not practical. In particular, the small size of the input fields which results from the limited size of the screens requires concentration on the handwritten input of the characters, which is not compatible with the safe operation of a motor vehicle in road traffic. For this reason, the handwritten input of alphanumeric characters is usually carried out as a successive input of individual characters. In this case, "successive" is meant in the sense of a temporal sequence. Depending on the size of the two-dimensional input field, the input in this field can be carried out in succession or on top of one another.

Alphanumeric characters and gestures input in handwriting via a touch-sensitive input unit or a touch-sensitive screen can be recognized more reliably if only a limited selection of characters or gestures is permitted. In this case, the characters or gestures respectively permissible for a user input are dependent on the system or program to be operated or the application to be operated. Different input fields can be provided within a program or an application, for which input fields an individual limited selection of characters or gestures is in turn permissible. In order to provide an adapted recognition algorithm for the handwritten input of alphanumeric characters and gestures, the system or program to be operated or the application to be operated must transfer a corresponding item of information to the system part which evaluates the handwritten input. If this information is not available, a general recognition algorithm must be used, which may result in less reliable recognition of the characters input in handwriting. For example, it is very difficult to distinguish between the handwritten input of the letter "O" and the digit "zero" if an input field is not exclusively provided for letters or is not exclusively provided for numbers and this information is available to the handwriting recognition apparatus.

It becomes clear from this example that pattern recognition alone on the basis of the geometrical analysis of the trajectories alone does not reach the goal. In this case, only consideration of the application context can help. Furthermore, the knowledge of database contents may also help if the input relates to said contents, or the knowledge of structure rules, for example rules for setting up valid telephone numbers which may differ from country to country. Otherwise, the handwriting recognition can use the context information to improve the handwritten inputs using context-specific dictionaries provided with frequency information, taking into account general statistical speech information, for example bigram and trigram frequencies etc.

The practice of providing adapted virtual keyboards for particular input fields is known from tablet computers and mobile telephones having touch-sensitive screens. For example, the placement of the cursor in an input field for an email address may result in the displayed virtual keyboard showing keys for special characters which are usually used in email addresses, for example an "@" character. If the cursor is placed in an input field for a telephone number, the displayed virtual keyboard may consist of a numeric keypad.

However, adapted virtual keyboards are provided only when the respective application or the respective program, the operation of which requires an input, transfers a corresponding item of information to the program routine responsible for displaying the virtual keyboard. The transfer of a corresponding item of information is known, for example, from the HTML 5 standard ("input type" attribute). If the application or the program does not transfer the required information, a standard keyboard is displayed, in which possibly required characters are not available on the first level, but rather only after switching to another level of the keyboard.

The practice of automatically adapting or selecting recognition algorithms for the optical character recognition (OCR) for a limited selection of characters without a system or program or an application providing a corresponding item of information is known from U.S. Pat. No. 7,489,415 B2. In the known system, the adjustment is carried out on the basis of the coordinates of an input location on a form which has previously been filled in. In this case, a field type is stored for each input location of each form in the system.

Another way of automatically adapting or selecting recognition algorithms for the optical character recognition for a limited selection of characters which are input into different fields of forms is known from US 2014/0201102 A1. In this case, the field type of a respective input field is determined by means of optical character recognition of the form, and that part of the respective field which is filled in in handwriting is only then evaluated using the adapted or selected recognition algorithm.

However, the known ways of automatically adapting or selecting recognition algorithms are not suitable for an imminent handwritten input of characters or gestures on a touch-sensitive screen or a touch-sensitive input unit because it is not possible here to optically capture a form and accordingly evaluate input locations or names of form fields.

BRIEF SUMMARY

Technical Object

An object of the invention is to specify a method and an apparatus for automatically selecting or adapting recognition algorithms for a handwritten input of characters or gestures on a touch-sensitive screen or a touch-sensitive input unit, which are not dependent on information relating to field types which is provided by the respective system or program to be operated or the application to be operated.

Technical Achievement

This object is achieved by means of the method stated in claim 1 and by means of the apparatus stated in claim 7. Advantageous developments and configurations of the method and of the apparatus are stated in the respective dependent claims.

A method according to the invention for automatically selecting one of a plurality of recognition algorithms for a handwritten input of alphanumeric characters and/or gestures into a selected input field displayed on a screen using a touch-sensitive input apparatus comprises carrying out optical character recognition in a region of the screen which comprises at least the input field and the immediate environment of the input field. Alternatively, it is possible to carry out voice recognition for a voice instruction acoustically output after the selected input field has been displayed. In this case, it may be useful to carry out the optical character recognition or the voice recognition only after one of a plurality of input fields has been selected on the screen.

In this case, it is possible to distinguish between two cases. If the voice instruction has been locally created in the same system, context information which is already suitable is generally locally available in this system. In other cases, for example if the voice instruction is received from a cloud server, for example, it is necessary to use a voice recognizer which is provided locally or again in another cloud server in order to determine the necessary context information. As an alternative to a cloud server, it is also possible to use a suitable smartphone which is locally coupled to the system, for example.

As a result of the optical character recognition, textual components are recognized in the recognition region and can be supplied to an analysis which is used to search for indications of the type of characters or gestures to be input. In this case, the type of characters or gestures to be input is dependent on the type of input field. If, for example, one of the words "call number", "telephone number", a corresponding abbreviation thereof or a telephone symbol is represented on the screen in the environment of the input field, it can be assumed that numbers or digits are to be input into the input field. If words such as "location" or "street" are found in the environment of the input field, it can be assumed that letters are to be input into the input field. The recognition algorithm or a parameter set adapted to recognize numbers or letters for a recognition algorithm for the handwritten input can be selected accordingly. The same accordingly applies to a voice instruction acoustically output with the display of the input field: If a voice instruction, for example "Please input a telephone number", is given when the input field is displayed or selected, it can be concluded, by analyzing the voice instruction converted into text by means of voice recognition, that numbers or digits are to be input into the input field.

It goes without saying that it is also possible to take into account terms in different languages when analyzing and searching for terms describing field types. An expansion of the corresponding database imposes only slightly higher requirements on the storage space required and is easy to implement. It is also conceivable to preferably first of all recognize terms in the language selected for the man-machine interface by the user and to only then carry out recognition for other languages.

The evaluation of the screen contents also comprises evaluating a so-called speller which predefines the next possibilities during continuous input of letters. One example is the input of city names when inputting a destination during navigation, in the case of which, after previously inputting a letter, the set of values for a subsequent letter is often considerably restricted. If a speller is recognized, the permissible set of values for the next character is always currently communicated to the handwriting recognizer. If available, permissible sequences of a plurality of characters for the next inputs may also be disclosed.

In one configuration of the invention, for the optical character recognition, at least one region of the screen which comprises at least the input field and the immediate environment of the input field is transmitted to an apparatus or program routine for optical character recognition which provides the result of the recognition. The transmission may be effected, for example, directly from the graphics memory of a screen control unit, for example in the form of an RGB bitmap in which the screen contents or the transmitted parts of the screen contents are in the form of a pixel representation. Some operating systems already contain functions which make it possible to create an image of the screen or of a window on the screen, a so-called snapshot, and to transfer it to other programs or applications. These include, for example, operating systems which carry out the graphics output using a compositor operating according to the Wayland Display Server Protocol. The transmitted image of the screen contents can then be examined for text contents and the position of the text relative to the input field on the screen, for example using a commercially available program for optical character recognition. References to the field type or the type of text input are then stored in a database for the text and possibly the position of the latter. The size of the region which includes the input field can be predefined in this case or can be adjusted by a user. It is also conceivable for the user to circle the input field for selection on a touch-sensitive screen using his finger or a suitable object and to thereby define the region.

In another configuration of the invention, for the voice recognition following the acoustic voice instruction, either an analog electrical signal output via loudspeakers, an accordingly available digital electrical signal or a control signal for a text-to-speech output unit is passed to an apparatus or program routine for voice recognition which provides the result of the recognition. In this configuration of the invention, a voice recognition system which is present in a vehicle anyway for the purpose of recognizing voice commands can be advantageously used.

If a so-called speller, the respective current output of which is captured by analyzing the current screen contents etc., is not predefined by the application program in question, the handwritten input can also be controlled, taking into account the most current input context, on the basis of database contents, on the basis of structure rules.

In this case, the corresponding database contents, for example the stored cities, can be accessed directly, for example locally, independently of the associated applications, for example the navigation. However, it is also possible to obtain such database contents from the outside, for example from a coupled smartphone or from a cloud server connected via the Internet. Structure rules may likewise be locally available in the system or can be retrieved from the outside, for instance from a smartphone or a cloud server. The range of values of the characters which is permissible for the next input and the next permissible character strings with respect to the input can be respectively disclosed to the handwriting recognizer.

An apparatus for automatically selecting one of a plurality of recognition algorithms or parameter sets for a handwritten input of alphanumeric characters and/or gestures into a selected input field displayed on a screen using a touch-sensitive input apparatus comprises first means which are set up to carry out optical character recognition in a region of the screen which includes at least the input field and the immediate environment of the input field. Alternatively, the first means may be set up to carry out voice recognition for a voice instruction acoustically output after the selected input field has been displayed. The apparatus also comprises second means which are set up to search for terms describing field types in the result of the optical character recognition or the voice recognition. Finally, the apparatus comprises third means which are set up to select a recognition algorithm which is adapted to a field type found in the result of the optical character recognition or the voice recognition or a parameter set for the recognition algorithm.

Optionally, a fourth means is provided which guides the handwritten input, character by character, taking into account the input context. This guidance has three forms:

the screen output of the so-called "speller" provided by the application expecting the input is used by analyzing the respective most current screen contents, depending on the input context and depending on the application in question, the database contents in question are accessed and the functionality of a "speller" itself is provided, in which case it is possible to access a local database available in the system and a remote database, for example in a coupled smartphone or in a cloud server which can be reached via the Internet, depending on the input context, a structure rule which can be retrieved either locally in the system or remotely, for instance in a coupled smartphone or a cloud server connected via the Internet, is used.

In one configuration of the apparatus, one or more of the first, second, third and/or optional fourth means have one or more microprocessors and main memories and non-volatile memories communicatively connected to the one or more microprocessors. The respective non-volatile memories store computer program instructions which, when loaded into the respective main memory from the one or more microprocessors and executed, cause the performance of parts of the method. The first, second and third means together finally perform all steps of the method.

In one configuration of the apparatus, the screen, the first, second, third and/or optional fourth means are arranged in a manner spatially separated from one another and are connected to one another by means of one or more communication networks. Communication between the individual components of the apparatus can be carried out in a conventional manner via the one or more communication networks. The screen is connected to control electronics using signaling. The screen may be, for example, a screen which is provided for a navigation device and is arranged in the dashboard of the motor vehicle, or a so-called head-up display in which the screen contents are projected onto the windshield or a transparent projection medium arranged in front of the latter in the field of view of the driver. This also concomitantly includes a holographic output which is placed in front of the windshield, for example.

A touch-sensitive input apparatus which can be used with the method according to the invention or which can be connected to the apparatus according to the invention comprises a touchpad which is arranged separately from a screen or an accordingly marked region on a touch-sensitive screen.

Different configurations which have been described in isolation above for reasons of clarity can be combined with one another, for example in order to achieve more reliable recognition of field types.

The present method according to the invention and the apparatus according to the invention can be advantageously used in a motor vehicle, but use in other areas of technology in which characters and/or gestures are input in handwriting is also conceivable. The selection of adapted recognition algorithms or adapted parameters for a recognition algorithm improves the handwritten input of alphanumeric characters and gestures and, in particular during operation of a motor vehicle, reduces the likelihood of corrections having to be made during input. As a result, the distraction of the driver from the traffic situation is reduced overall.

BRIEF DESCRIPTION OF THE DRAWINGS

The invention is described below on the basis of the figures in the drawing. In the drawing.

DETAILED DESCRIPTION

In the figures, the same or similar elements are provided with the same reference symbols.

Figure 1:
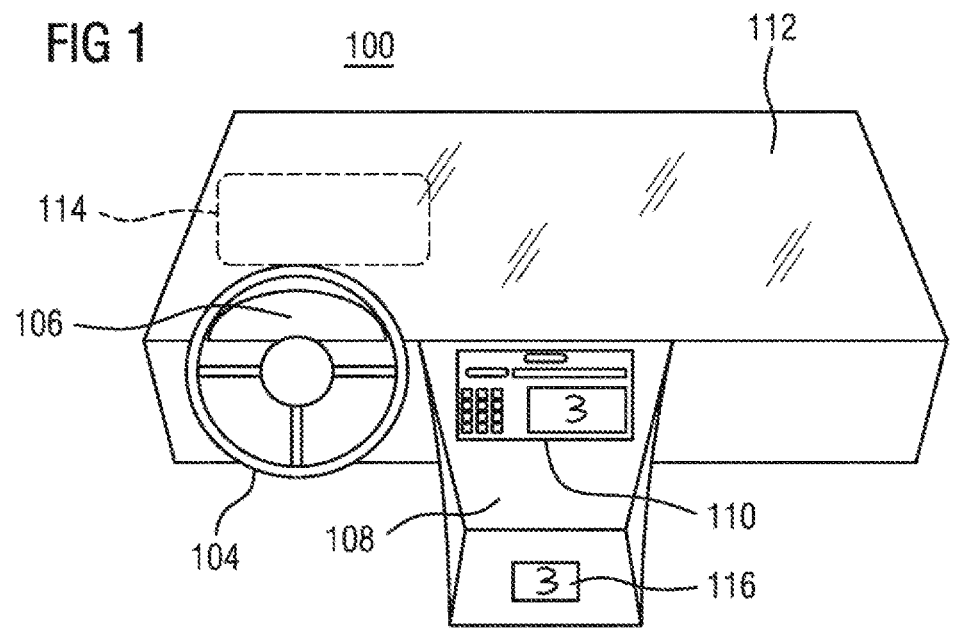
FIG. 1 shows a schematic illustration of a dashboard in a motor vehicle.

FIG. 1 shows a schematic illustration of a dashboard 100 in a motor vehicle. An instrument cluster 106 is arranged behind a steering wheel 104. A screen 110 and a touch-sensitive touchpad 116 are arranged in the region of a center console 108. A region in which a head-up display 114 displays information is also shown on a windshield 112. Like the screen 110 and the head-up display 114, the instrument cluster 106 may comprise a matrix display with graphics capability, that is to say a display which displays complex graphical structures by accordingly controlling individual pixels. That is to say, input fields for user inputs can be displayed on any of the display apparatuses. Irrespective of the display apparatus on which an input field is displayed, a user can make a handwritten input using the touch-sensitive touchpad 116 or an accordingly marked region on the screen 110. An optional holographic representation of visual contents and an optional connection to a coupled smartphone or to a cloud server via an Internet connection, for example, are not shown in the figure.

Figure 2:
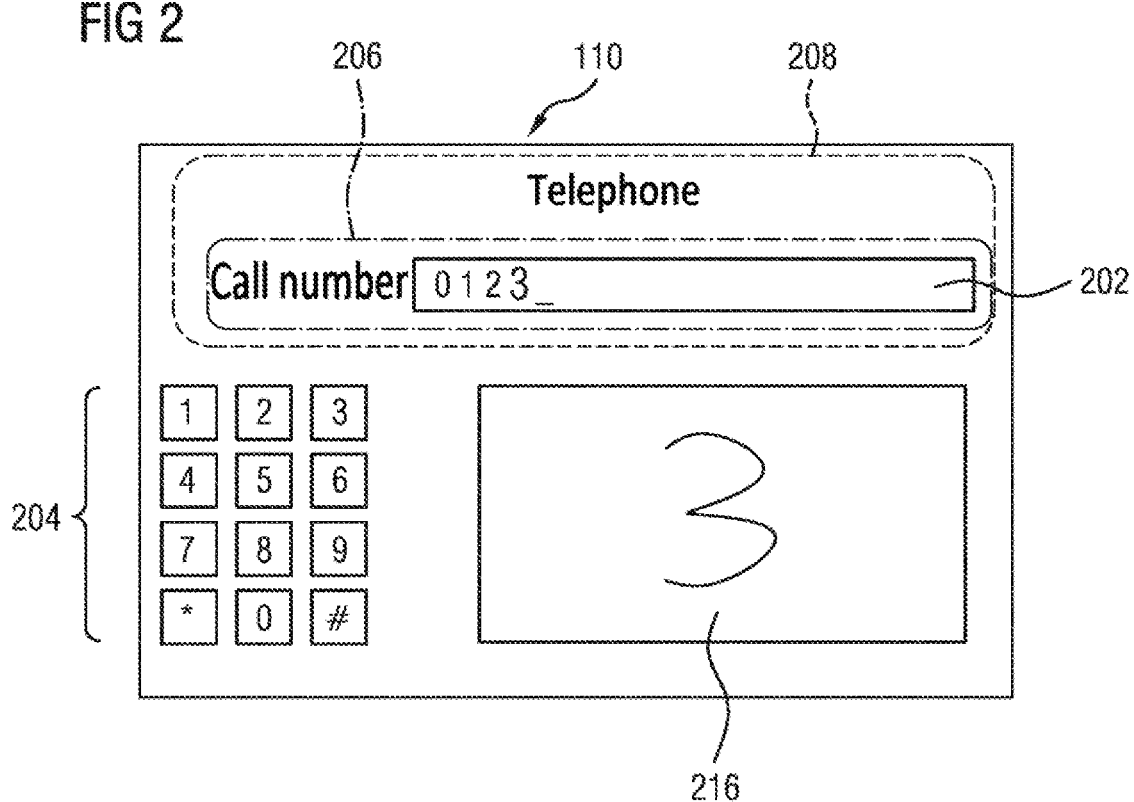
FIG. 2 shows a schematic illustration of a screen for explaining the method according to the invention.

FIG. 2 shows the schematic illustration of the screen 110 from FIG. 1 for explaining the method according to the invention. The starting situation is that in which a user would like to input a telephone number into an input field 202 provided for this purpose. A plurality of options are available to the user for this purpose. The user can input the digits by touching the corresponding virtual number keys of the numeric keypad 204 displayed on the screen 110. It should be noted that the screen 110 is a touch-sensitive screen. Alternatively, the user can input the digits via the touchpad 116 or via the marked region 216 representing a touchpad on the touch-sensitive screen 110, in which case the input is converted into a digit by means of handwriting recognition. In FIG. 2, the user has already input the first three digits of the telephone number, "0", "1" and "2", and has just finished inputting the fourth digit "3". For this purpose, the user has drawn the digit "3" on the touchpad 116 (not illustrated) or on the corresponding region 216 of the touch-sensitive screen 110 using his finger or another suitable input device. In the figure, the digit input last is illustrated in a slightly enlarged manner in comparison with the previously input digits. This can be used to indicate the conclusion of the recognition. In order to adapt the recognition algorithm for handwriting recognition for the input of digits, regions of the screen 110 around the input field 202 were subjected to optical character recognition. For example, after optical character recognition, a first region 206 is examined for terms which indicate the type of characters or gestures to be input into the input field 202. The first region 206 is indicated by the dot-dashed line. In this case, the term "call number" is illustrated on the left beside the input field 202 in the first region 206. A comparison with corresponding terms in a database makes it possible to conclude that only a limited selection of alphanumeric characters can be input. For a telephone number, these are the digits 0-9, the star key and the hash key, for example. A second region 208 which includes the input field and is larger than the first region 206 is illustrated in the figure. The second region 208 is indicated by the dashed line. In addition to the term "call number", optical character recognition carried out in this region also recognizes the term "telephone" which likewise indicates the type of alphanumeric characters to be input. The occurrence of two terms describing the characters to be input into the input field in the second region 208 can improve the determination of the type of input field and therefore the ultimate recognition of the characters to be input into the input field.

Figure 3:
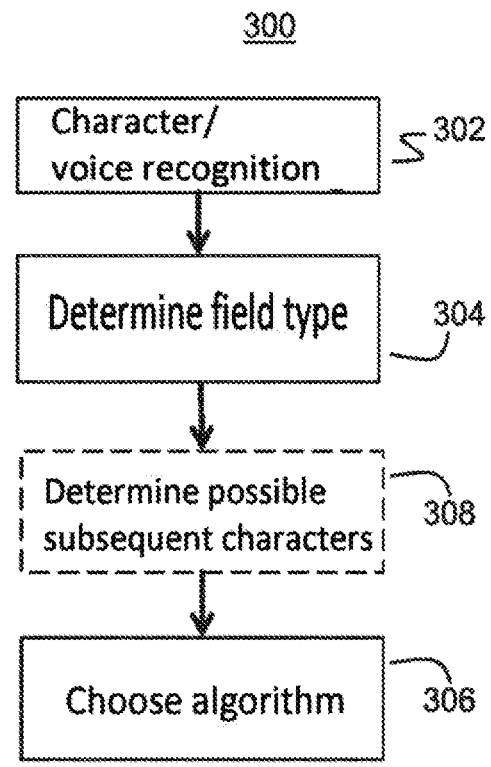
FIG. 3 shows a schematic flowchart of the method according to the invention.

FIG. 3 shows a schematic flowchart of the method 300 according to the invention. In step 302, character recognition or voice recognition is carried out in at least one region of the screen which includes a selected or active input field. The result of the character recognition or voice recognition is used to determine a type of input field in step 304. In the optional step 308, depending on the type of input field, a so-called speller is searched for in the screen contents or a read connection to a database of the type in question is set up directly, locally or remotely, if possible. Alternatively, possible structure rules for the input are searched for locally or remotely. On the basis of the result of the determination of the type of input field, an adapted recognition algorithm for the handwriting recognition or an adapted parameter set for the recognition algorithm is selected. The figure does not illustrate the selection of the region and the transfer of the region to be evaluated by the optical character recognition to the character recognition function or apparatus.

Figure 4:
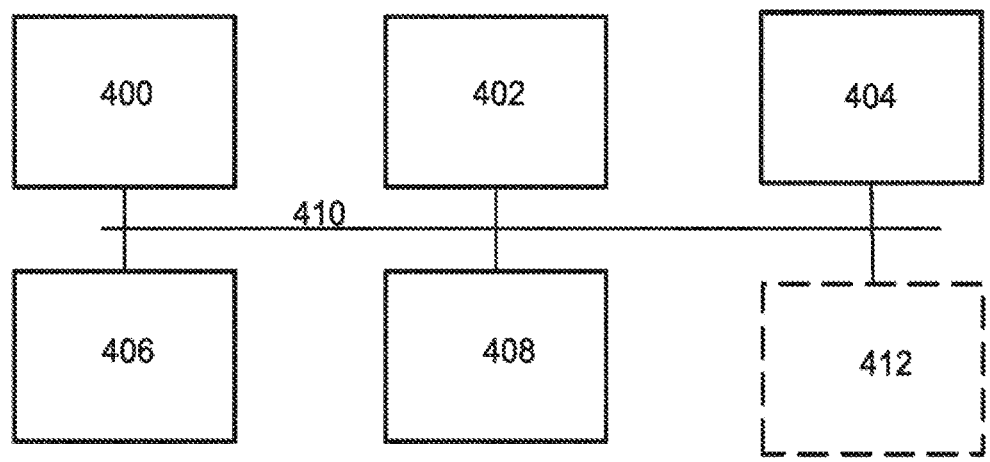
FIG. 4 shows a schematic illustration of a block diagram of an apparatus according to the invention.

FIG. 4 shows a schematic illustration of a block diagram of an apparatus according to the invention. First means 400 which are set up to carry out optical character recognition in a region of the screen which comprises at least the input field and the immediate environment of the input field are communicatively connected to second means 402 which are set up to search for terms describing field types in the result of the optical character recognition via one or more data buses 410. Instead of or in addition to the first means 400 for the optical character recognition, it is possible to provide further first means 404 which are set up to carry out voice recognition for a voice instruction acoustically output after the input field has been displayed. The further first means 404 are likewise communicatively connected to the second means via the one or more data buses 410. One or more screens 406 are likewise communicatively connected at least to the first means 400 via the one or more data buses 410 in order to make it possible for the first means 400 to access that region of the screen which comprises at least the input field and the immediate environment of the input field or to transmit the image information to the first means 400. Finally, third means 408 are communicatively connected at least to the second means 402 via the one or more data buses 410 in order to select a recognition algorithm which is adapted to the handwritten input of alphanumeric characters and/or gestures or an adapted parameter set for the recognition algorithm on the basis of the terms which describe field types and were found by the second means. The third means comprise, for example, a database and an apparatus or a computer program which compares the terms found using the character or voice recognition with terms stored in the database and, in the event of a hit, selects a corresponding recognition algorithm adapted to a field type or an adapted parameter set for the recognition algorithm.

Optionally, it is also possible to provide means 412 which dynamically control the input with respect to a database taking into account already available contents by restricting the inputs which are still expected. This can be carried out locally or remotely, for example, using "speller" functionalities which are already provided by the corresponding application or alternatively by directly accessing the corresponding database, or structure rules for the input are retrieved locally or remotely. These structure rules may be country-dependent, for example. This step is used to determine an extended parameter set for the recognition algorithm.

The invention claimed is:

1. A method for automatically selecting one of a plurality of recognition algorithms or one of a plurality of parameter sets for a recognition algorithm for at least one of a handwritten input of alphanumeric characters and gestures to be input into a selected input field of an application program displayed on a screen using a touch-sensitive input apparatus installed in a motor vehicle, comprising:
   before the handwritten input is input into the selected field and after the selected input field has been selected on the screen, carrying out optical character recognition in a region of the screen which includes at least the input field and the immediate environment of the input field, or carrying out voice recognition for a voice instruction acoustically output after the selected input field has been displayed, wherein the optical character recognition comprises:
      transmitting an image of what is displayed in at least one region of the screen which includes at least the input field and the immediate environment of the input field to an apparatus or to a computer program for optical character recognition, and
      receiving the result of the optical character recognition, searching for terms in the result of the optical character recognition or the voice recognition, on the basis of which terms the field type of the input field can be determined, determining the field type on the basis of the terms found, and selecting a recognition algorithm which is adapted to a field type found in the result of the optical character recognition or the voice recognition or a parameter set for the recognition algorithm such that selecting the recognition algorithm depends on carrying out optical character recognition, before the handwritten input is input into the selected field and after the selected input field has been selected on the screen, in the region of the screen which includes at least the input field and the immediate environment of the input field, or carrying out voice recognition for a voice instruction acoustically output after the selected input field has been displayed whereby selection, before inputting handwritten input, of adapted recognition algorithms or adapted parameters for a recognition algorithm improves recognition of subsequently input handwritten input thereby reducing a likelihood of corrections having to be made during input thereby reducing driver distraction.

2. The method as claimed in claim 1, wherein the voice recognition comprises:

recording the acoustically output voice instruction or receiving a signal representing the acoustic voice instruction, and receiving the result of the voice recognition.

3. The method as claimed in claim 2, wherein the signal representing the acoustic voice instruction is a digital or analog representation of electrical signals output via one or more loudspeakers or a control signal for a text-to-speech output unit.

4. The method as claimed in claim 1, wherein the optical character recognition or the voice recognition is carried out after one of a plurality of input fields has been selected on the screen.

5. An apparatus for automatically selecting one of a plurality of recognition algorithms for at least one of a handwritten input of alphanumeric characters and gestures to be input into a selected input field of an application program displayed on a screen using a touch-sensitive input apparatus installed in a motor vehicle, comprising:

first means which are set up to, before the handwritten input is input into the selected field and after the selected input field has been selected on the screen, carry out optical character recognition in a region of the screen which includes at least the input field and the immediate environment of the input field, or are set up to carry out voice recognition for a voice instruction acoustically output after the selected input field has been displayed, wherein the first means comprise:

means for transmitting an image of what is displayed in at least one region of the screen which includes at least the input field and the immediate environment of the input field to an apparatus or to a computer program for optical character recognition, and means for receiving the result of the optical character recognition, second means which are set up to search for terms describing field types in the result of the optical character recognition or the voice recognition, and third means which are set up to select a recognition algorithm which is adapted to a field type found in the result of the optical character recognition or the voice recognition or a parameter set for the recognition algorithm such that the third means depends on carrying out optical character recognition, before the handwritten input is input into the selected field and after the selected input field has been selected on the screen, in the region of the screen which includes at least the input field and the immediate environment of the input field, or carrying out voice recognition for a voice instruction acoustically output after the selected input field has been displayed whereby selection, before inputting handwritten input, of adapted recognition algorithms or adapted parameters for a recognition algorithm improves recognition of subsequently input handwritten input thereby reducing a likelihood of corrections having to be made during input thereby reducing driver distraction.

6. The apparatus as claimed in claim 5, also comprising a fourth means which is set up to select a recognition algorithm or a parameter set for the recognition algorithm on the basis of possible characters or gestures to be input, wherein the possible characters or gestures to be input are determined from preceding inputs, and wherein the determination is carried out according to linguistic rules or by comparing words stored in a database.

7. The apparatus as claimed in claim 6, wherein the screen, the first, second, third and/or fourth means are arranged in a manner spatially separated from one another and are connected to one another by means of one or more communication networks.

8. The apparatus as claimed in claim 7, wherein the voice recognition comprises:

recording the acoustically output voice instruction or receiving a signal representing the acoustic voice instruction, and receiving the result of the voice recognition.

9. The method as claimed in claim 8, wherein the signal representing the acoustic voice instruction is a digital or analog representation of electrical signals output via one or more loudspeakers or a control signal for a text-to-speech output unit.

10. The method as claimed in claim 9, wherein the optical character recognition or the voice recognition is carried out after one of a plurality of input fields has been selected on the screen.

\* \* \* \* \*